BEST AVAILABLE COPY
No. 12,527. REISSUED AUG. 28, 1906.
W. S. CARLISLE.
AUTOMATIC LIFT AND DROP CABINET.
APPLICATION FILED FEB. 28, 1905.
2 SHEETS—SHEET 1.
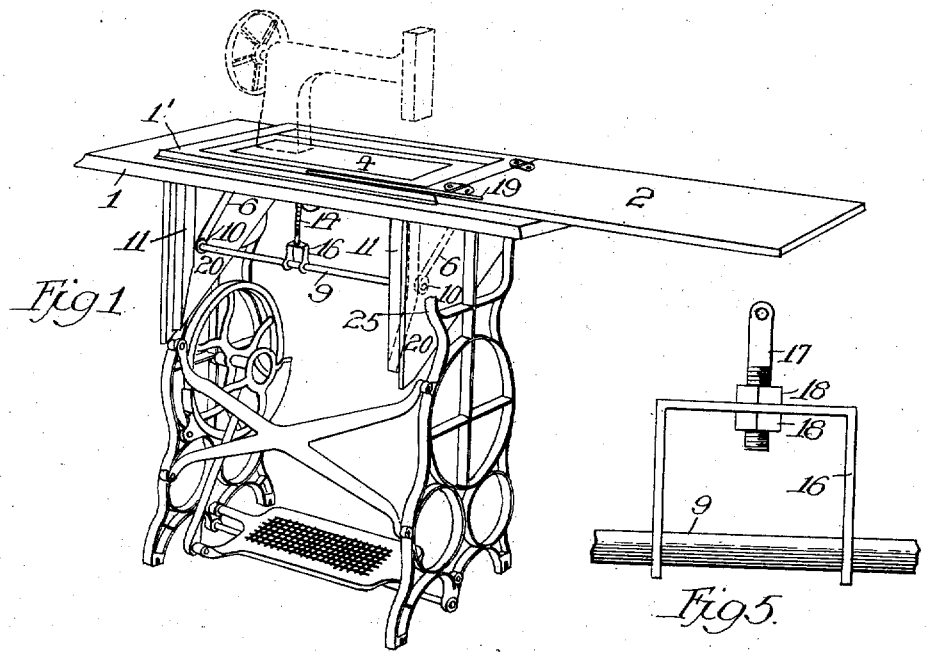
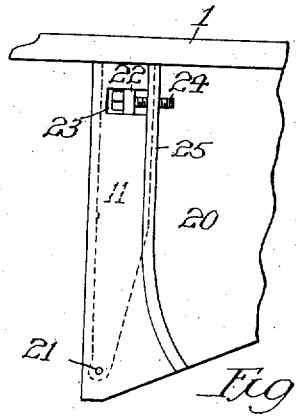
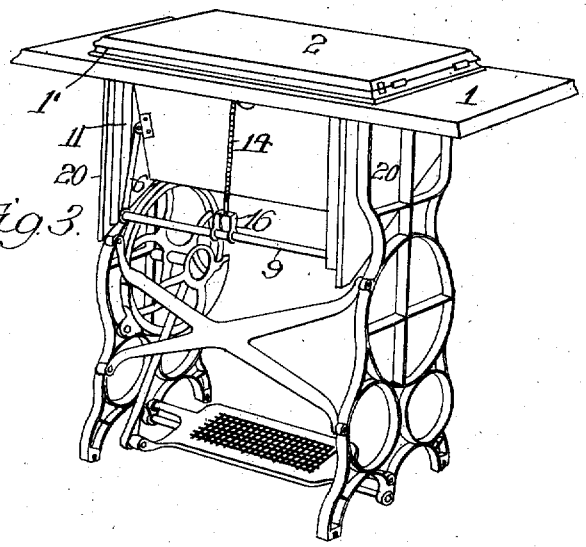
Witnesses;
Edw. P. Barrett
Louis B. Erwin
Inventor
Wm S Carlisle
by Rector & Hebben
his Atty's.
THE NORRIS PETERS CO., WASHINGTON, D. C.

No. 12,527. REISSUED AUG. 28, 1906.

W. S. CARLISLE.

AUTOMATIC LIFT AND DROP CABINET.

APPLICATION FILED FEB. 28, 1905.

2 SHEETS—SHEET 2.

Witnesses;
Edw. P. Barrett
Louis B. Erwin

Inventor
Wm S Carlisle
by Rector & Hibben
his Attys

THE HORRIS PETERS CO., WASHINGTON, D. C.

UNITED STATES PATENT OFFICE.

WILLIAM S. CARLISLE, OF DAYTON, OHIO, ASSIGNOR TO THE DAVIS SEWING MACHINE COMPANY, OF DAYTON, OHIO, A CORPORATION.

AUTOMATIC LIFT AND DROP CABINET.

No. 12,527. Specification of Reissued Letters Patent. Reissued Aug. 28, 1906.

Original No. 732,168, dated June 30, 1903. Application for reissue filed February 28, 1905. Serial No. 248,170.

*To all whom it may concern:*

Be it known that I, WILLIAM S. CARLISLE, a citizen of the United States, residing at Dayton, in the county of Montgomery and State of Ohio, have invented certain new and useful Improvements in Automatic Lift and Drop Cabinets, of which the following is a description, reference being had to the accompanying drawings, forming part of this specification.

The object of my invention is, first, to provide improved means for raising and lowering the movable machine-table upon which a sewing-machine head, type-writer, or other machine may be secured and firmly holding the same in working position, and, second, to provide means for that purpose of such a character that it may be inclosed and operate within a stationary dustproof casing beneath the top of the machine-cabinet, into which casing the machine table and head are lowered when not in use and covered by the hinged leaf or lid of the cabinet.

The novelty of my invention will be hereinafter more fully described, and particularly pointed out in my claims.

Figure 2:
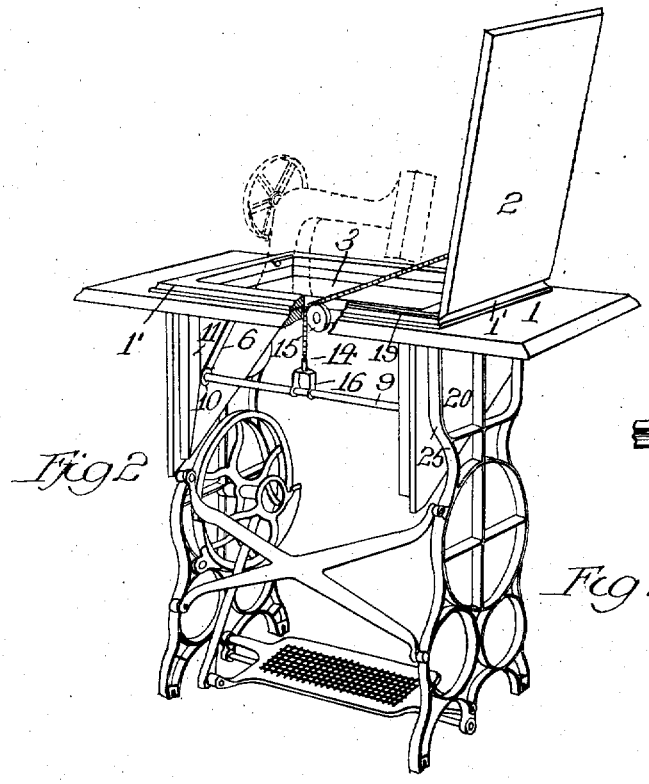
Figure 4:
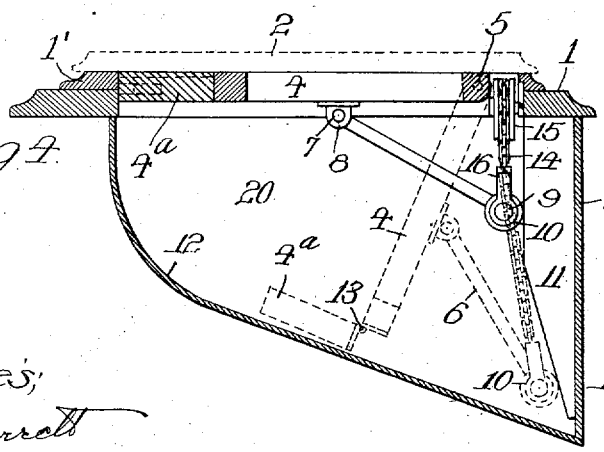

In the accompanying drawings, Figure 1 is a perspective view of a sewing-machine stand and cabinet embodying my invention with the machine table and head in working position and the dustproof casing partially removed to expose the parts within it; Fig. 2, a corresponding view showing the parts in the position which they occupy when the machine table and head are being raised into or lowered from working position; Fig. 3, a similar view showing the parts in the position they occupy when the machine table and head are lowered out of working position and the hinged leaf or lid of the cabinet closed; Fig. 4, an enlarged cross-sectional view showing the dustproof casing and the parts inclosed within it; Fig. 5, an enlarged detail view of the adjustable connection between the chain and lifting-frame, and Figs. 6 and 7 detail views showing means for adjusting the tracks upon which the rollers of the lifting-frame travel.

The same numerals of reference are employed to designate corresponding parts in the several views.

1 designates the usual top table of a sewing-machine, type-writer, or similar cabinet (in the present instance a sewing-machine) having secured to it a central raised frame 1′, to one end of which is hinged the leaf or lid 2. The table 1 and frame 1′ are provided with a suitable rectangular opening 3, Fig. 2, to receive the movable machine table or head frame 4, which is hinged at its rear edge in said opening at 5, Fig. 4, so as to be capable of swinging downward to the position shown in dotted lines in said figure and upward to the position shown in solid lines. At its forward edge this machine-table 4 is provided with a hinged section 4ª, which lies in the same horizontal plane as the table 4 when the latter is in elevated position, as in Fig. 4, but swings upon its hinge to the position shown by the dotted lines in said figure when the machine-table is lowered. The machine-head (shown in dotted lines in Figs. 1 and 2) is secured to the hinged table 4 over a suitable opening therein, as usual. The structure so far described is old and well known.

The space beneath the hinged table 4 4ª is inclosed by a stationary dustproof casing composed of side walls 20, rear wall 21, Fig. 4, and a curved bottom and front wall 12. It is essential to the employment of a stationary casing of this character that the forward portion of its bottom wall shall be located at such height as to accommodate the knees of the operator, whose feet rest upon the treadle of the machine, and it is desirable that the rear portion of such bottom wall shall also be located at such a height as to be above the operating-wheel driven by the treadle. This wheel cannot well be lowered beyond a certain point, owing to the nature of the driving connection between it and the treadle, while the top table or platform of the machine-cabinet cannot be elevated beyond a certain height necessary to meet average conditions. The space which may be inclosed within a stationary dustproof casing beneath the top table of the machine is therefore necessarily circumscribed, and to accommodate the hinged machine table and head and their lifting and lowering devices to this circumscribed space I have devised the following mechanism:

In the first place, as heretofore stated, I hinge the machine-table 4 at the rear of the opening in the top table of the machine and provide it with the hinged forward section 4[a], so that it may be swung upward and downward to and from working position within a minimum amount of space in the lower forward part of the casing, and in the second place I provide a lifting-frame for the hinged machine-table 4 which can operate within a minimum amount of space in the lower rear part of the casing. This lifting-frame is composed of two short arms 6 6, pivoted at their upper forward ends to the opposite ends of the hinged machine-table 4, about midway of the latter from front to rear, and a cross rod or bar 9 connecting their rear ends, Figs. 1, 2, 3, and 4. The opposite ends of this lifting-frame bear against and travel upwardly and downwardly upon a pair of tracks 11 11, secured to the side walls 20 of the casing, anti-friction-rollers 10, mounted upon the frame and traveling on the tracks 11 11, serving to relieve friction between the parts. The lower ends of the tracks 11 11 are beveled or inclined rearwardly for a purpose hereinafter explained.

Journaled in the top table of the machine, above and about midway of the length of the cross-rod 9 of the lifting-frame, Fig. 2, is a guide-pulley 15, over which passes a chain 14, which is connected at its lower end to the rod 9 and at its opposite end to the hinged leaf 2 of the machine-cabinet, the particular form of connection between the lower end of the chain and the rod 9 being shown in Fig. 5. Under this construction and connection of the parts when the machine-cabinet is closed and the parts are in the position shown in Fig. 3 the swinging open of the hinged leaf 2 to the position shown in Fig. 2 will raise the rod 9 and lifting-frame and machine-table 4 from the position shown by the dotted lines in Fig. 4 toward the position shown by the solid lines in that figure, while the further outward and downward movement of the hinged leaf to horizontal position, Fig. 1, will lift the parts completely to the position shown by the solid lines in Fig. 4. A return movement of the leaf 2 to closed position, Fig. 3, will correspondingly lower the hinged machine-table and lifting-frame to the position shown by the dotted lines in Fig. 4.

By employing a lifting-frame for the hinged machine-table composed of short arms 6 6, pivoted at their upward forward ends to the opposite ends of the machine-table midway of its length from front to rear, and a cross rod or bar 9, connecting their lower rear ends and bearing at its opposite ends (through an-antifriction-rollers 10 10) against the tracks 11 11 I attain a number of advantages over any prior lift and drop mechanism known to me.

In the first place the hinged machine table or head frame is necessarily of limited external dimensions, while the opening in it must be of relatively large size to accommodate the bed-plate of the machine-head. Consequently there is left but a narrow margin of material around the opening in the frame, particularly at the front and rear sides of the latter, the margins at the ends being somewhat wider and stronger. These frames, which are usually of wood, are therefore somewhat frail structures to support so heavy a body as the machine-head and its bed-plate. By employing a lifting-frame having the comparatively short arms 6 6 and pivoting their upper forward ends to the machine table or head frame at its comparatively strong ends (instead of its weaker forward side) and providing the widely-separated bearings for the lower rear end of the lifting-frame (instead of a single bearing midway of the length of the frame) a much stronger and firmer support for the machine-table and machine-head is thereby afforded than has heretofore been attained, and the parts mentioned are not only more firmly and securely supported in working position when moved thereto, but are less liable to strain and injury in being moved toward and from such position.

In the second place the short length of the arms 6 6 permits the downward movement of their rear ends at the lowering of the machine-table from working position to be accommodated by a minimum amount of vertical space in the rear portion of the dustproof casing, so highly essential because of the limited vertical space available between the operating-wheel of the machine and its top platform, as heretofore explained. This advantage is still further increased by beveling or inclining the lower ends of the tracks 11 11 toward the rear, so that the lower end of the lifting-frame may swing rearward as it approaches its limit of movement and is therefore not projected so far downward in fully lowering the machine-table as would be necessary if the bearing-surfaces of the tracks 11 11 were vertical throughout their length.

In the third place the employment of a lifting-frame composed of the two side arms 6 6, located at the extreme opposite sides of the machine and connected at their rear ends by the long cross rod or bar 9, enables me to employ a rod or bar having some resiliency, and thereby secure a locking of the machine-table in working position when lifted thereto and prevent vibration thereof in a manner which may now be explained. The length of the chain 14, connecting the hinged leaf 2 with the rod 9, and the adjustment of the parts are such that the rod 9 and lifting-frame and machine table and head are raised to the limit of their upward movement (against suitable stops, not shown) before the hinged leaf 2 in its outward and downward movement from the position shown in Fig. 2 quite reaches the horizontal position (shown in Fig. 1) and comes to rest upon the top platform 1 of the machine-cabinet. It so nearly reaches such position, however, by the time the lifting-frame and machine table and head reach their limit of upward movement that it exerts a powerful leverage upon the rod 9 of the lifting-frame through the medium of the chain 14 and springs said rod slightly upward at its middle as the leaf reaches horizontal position. When it comes to rest, therefore, the chain 14 and rod 9 are left under tension, with the machine-table firmly pressed upward and supported in working position. The weight of the hinged leaf 2 and direction of pull of chain 14 are such that the parts are securely locked in this position until the leaf 2 is again lifted by hand. A groove 19, formed in the rectangular frame 1′ and leaf 2, accommodates the chain 14 when the leaf is in open horizontal position and leaves the upper edge of the chain flush with or below the upper surface of the frame and leaf instead of projecting above them.

The lower end of the chain 14 is connected to the rod 9 of the lifting-frame by the devices shown in Fig. 5, where 16 represents a yoke or stirrup, through the lower ends of whose depending arms the rod 9 loosely passes. The lower end of the chain 14 is connected to this yoke by means of an adjusting-screw 17, which passes through the yoke and is provided upon opposite sides of the latter with lock-nuts 18, by which it may be locked in adjusted position. By this provision any slack in the chain may be taken up and the connection between the hinged leaf and lifting-frame be so adjusted as to produce and preserve the desired tension upon the parts when the leaf is in open horizontal position. The employment of the resilient bar 9, however, by introducing a yielding or spring connection between the hinged leaf and the machine-table obviates the necessity for such frequent or exact adjustment of the parts as would otherwise be necessary.

Instead of the chain 14 any other suitable flexible connection between the lifting-frame and lid, such as a metal band or wire cable, may of course be employed.

Figure 7:
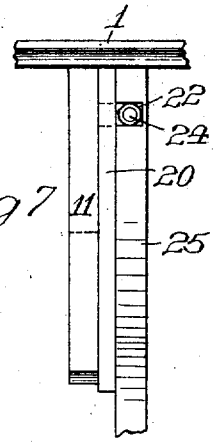

In Figs. 6 and 7 I have shown means for adjusting the tracks 11 11 to properly position them relatively to the lifting-frame. As there shown, the tracks are pivoted at their lower ends to the side pieces 20 of the dust-proof casing at 21 and at their upper ends are provided with outwardly-projecting lugs 22, which pass through slots 23 in the side pieces 20. Adjusting-bolts 24 are passed through the lugs 22 and through coincident threaded holes in the iron supporting-frame 25 of the machine. By turning the bolts 24 in one direction or the other the upper ends of the tracks 11 may be either moved forward or permitted to move backward and adjusted accordingly.

The word "cabinet" as used in this specification refers to the wood furniture of a sewing-machine, type-writer, or other machine-operating table, whether an iron stand supports the cabinet-work or not.

I am aware of the automatic lift and drop cabinet disclosed in the Abramson and Person Patent No. 670,126, dated March 19, 1901; but the construction there exhibited embodies none of the advantages of my improved lift and drop mechanism heretofore pointed out, as will be apparent from a comparison of the two constructions in connection with the foregoing description.

Having thus fully described my invention, what I claim is—

1. In an automatic lift and drop cabinet, the combination of a machine-table hinged at its rear edge in a suitable opening in the top of the cabinet, a lifting-frame therefor connected at its upper forward end to the opposite ends of said machine-table and adapted to travel at its lower rear end upon vertical bearing-surfaces at opposite sides of the machine, a guide located above the rear end of said frame about midway of its length, and a chain passing over said guide and connected at its lower end to the frame and at its opposite end to the hinged leaf of the cabinet; substantially as described.

2. In an automatic lift and drop cabinet, the combination of a machine-table hinged at its rear edge in a suitable opening in the top of the cabinet, a lifting-frame therefor connected at its upper forward end to the opposite ends of said machine-table, a pair of upright tracks located in rear of said frame at opposite sides of the machine, a pair of antifriction-rollers mounted on the frame and adapted to travel on said tracks in the lift and drop movements of the frame, a guide located above the rear end of said frame about midway of its length, and a chain passing over said guide and connected at its lower end to the frame and at its opposite end to the hinged leaf of the cabinet; substantially as described.

3. In an automatic lift and drop cabinet, the combination of a movable machine-table, a lifting-frame therefor having side arms connected by a transverse resilient rod or bar, and a flexible connection between said rod and the hinged leaf of the cabinet, whereby the lifting-frame and machine table and head may be raised and the parts put under spring tension by swinging the hinged leaf outward to horizontal position; substantially as described.

4. In an automatic lift and drop cabinet, the combination of a machine-table hinged at its rear edge in a suitable opening in the top of the cabinet, a lifting-frame therefor connected at its upper forward end to the opposite ends of said machine-table and adapted to travel at its lower rear end upon vertical bearing-surfaces at opposite sides of the machine, and a flexible spring connection between the lifting-frame and the hinged leaf of the cabinet whereby the lifting-frame and machine table and head may be raised and the parts put under spring tension by swinging the hinged leaf outward to horizontal position; substantially as described.

5. In an automatic lift and drop cabinet, the combination of a machine-table hinged at its rear edge in a suitable opening in the top of the cabinet, a lifting-frame therefor comprising a pair of arms pivoted at their upper forward ends to the opposite ends of said machine-table and connected at their lower rear ends by a transverse resilient rod or bar, the rear end of said frame being adapted to travel up and down upon bearing-surfaces at the opposite sides of the machine in the lift and drop movements of the frame, a guide located above the transverse rod of said frame about midway of its length, and a chain passing over said guide and connected at its lower end to said rod and at its opposite end to the hinged leaf of the cabinet; substantially as described.

6. In an automatic lift and drop cabinet, a movable machine-table, a frame consisting of arms pivotally connected to the opposite ends of said table, a lifting-rod approximately the length of said table and to the ends of which the said arms are connected, rollers mounted on the ends of said frame, a track mounted in a plane coinciding with the plane of movement of each of said rollers and against which the said rollers ride, a stirrup mounted on said lifting-rod, said stirrup having a combined horizontal and rocking movement on said lifting-rod, and an adjustable connection between said stirrup and the hinged top leaf of the cabinet, through which movement is transmitted from said top leaf to the opposite ends of said movable machine-table; substantially as set forth.

7. In a lift and drop cabinet, a movable machine-table, arms pivotally connected to opposite ends of said table, a horizontal bar connected to said arms, said bar and arms constituting a swinging frame which supports the movable machine-table at two points and thereby prevents undue vibrations thereof, and receding tracks in the rear of said swinging frame and upon which said frame rides in the swinging movements thereof.

8. In an automatic lift and drop cabinet, the combination of a movable machine-table, a lifting-frame therefor pivoted at its upper forward end to the opposite ends of said table and provided at its lower rear end with a pair of antifriction-rollers, a pair of tracks for said rollers having vertical upper portions and rearwardly-inclined lower portions, and a flexible connection between the lifting-frame and the hinged leaf of the cabinet; substantially as described.

9. In an automatic lift and drop cabinet, the combination with a movable machine-table, of a lift and drop frame consisting of arms pivotally connected to opposite points of said table, a horizontal bar connecting said arms, and receeing tracks in the rear of said frame and against which said frame rides in the lift and drop movements, said frame being located and movable wholly within the dustproof casing.

10. In a lift and drop cabinet, a movable machine-table, arms pivotally connected to opposite ends of said table, a horizontal cross-bar connected to said arms, said arms and cross-bar constituting a frame which is movable wholly within the dustproof casing, rollers mounted on said frame, and tracks located in the rear of said frame and against which said rollers ride, the said tracks having tapering surfaces which permit the frame to move rearwardly and thereby complete its drop movement within the dustproof casing.

11. In a lift and drop cabinet, the combination with a hinged leaf and a movable machine-table, of a frame located and movable wholly within the dustproof casing, said frame consisting of arms pivotally connected to opposite points of said movable machine-table, a horizontal bar to which said arms are connected, the said bar being approximately the length of said table, rollers mounted on said frame, tracks mounted in the rear of said rollers and against which said rollers travel in the lift and drop movement of the frame, said tracks terminating at their lower ends in rearward inclinations which permit the frame to move rearwardly in completing its drop movements, and a connection between the horizontal bar and the hinged leaf whereby movement is imparted to said frame in the movements of opening and closing the hinged leaf; substantially as and for the purposes specified.

12. In an automatic lift and drop cabinet, the combination of a movable machine-table, a lifting-frame therefor comprising a pair of arms pivoted at their upper forward ends to the opposite ends of said table and having their lower rear ends connected by a horizontal cross-bar, antifriction-rollers mounted on said frame, tracks for said rollers located in rear of said frame and pivotally mounted at their lower ends, and means for adjusting them at their upper ends; substantially as described.

WILLIAM S. CARLISLE.

Witnesses:
EDWARD RECTOR,
LOUIS B. ERWIN.